United States Patent [19]
Abe

[11] Patent Number: 5,235,460
[45] Date of Patent: Aug. 10, 1993

[54] ERECT IMAGE FINDER
[75] Inventor: Tetsuya Abe, Hokkaido, Japan
[73] Assignee: Asahi Kogaku Kogyo Kabushiki Kaisha, Tokyo, Japan
[21] Appl. No.: 795,531
[22] Filed: Nov. 21, 1991
[30] Foreign Application Priority Data Nov. 26, 1990 [JP] Japan .................................. 2-321631
Oct. 18, 1991 [JP] Japan .................................. 3-298118

[51] Int. Cl.$^5$ ...................... G03B 13/06; G02B 23/14; G02B 23/02
[52] U.S. Cl. .................................. 359/431; 359/432; 354/152; 354/219
[58] Field of Search .................. 359/431, 432, 833–836, 359/676; 354/152, 219

[56] References Cited
U.S. PATENT DOCUMENTS

| | | |
|---|---|---|
| 3,956,759 | 5/1976 | Karikawa . |
| 4,751,539 | 6/1988 | Yamada et al. ..................... 354/222 |
| 4,779,966 | 10/1988 | Friedman ...................... 359/754 |
| 4,779,969 | 10/1988 | Sato et al. ....................... 359/432 |
| 4,906,078 | 3/1990 | Inabata et al. . |
| 4,909,614 | 3/1990 | Itoh et al. . |
| 4,941,012 | 7/1990 | Inabata . |
| 4,947,198 | 8/1990 | Inaobe et al. . |
| 4,963,912 | 10/1990 | Suda et al. . |
| 4,969,723 | 11/1990 | Kato et al. . |
| 4,992,809 | 2/1991 | Nozaki et al. . |
| 4,999,658 | 3/1991 | Kamitani et al. ............... 354/225 |
| 5,005,955 | 4/1991 | Ohshita ........................ 354/225 |
| 5,034,763 | 7/1991 | Inabata ........................ 359/646 |
| 5,083,149 | 1/1992 | Kudo et al. .................... 354/219 |
| 5,091,739 | 2/1992 | Kawamura .................... 354/152 |

FOREIGN PATENT DOCUMENTS 63-226616 9/1988 Japan .
515973 12/1939 United Kingdom ............... 359/833
2244146 11/1991 United Kingdom .

OTHER PUBLICATIONS

English abstract of Japanese Unexamined Patent Publication No. 63-226616.

Primary Examiner—Jon W. Henry
Attorney, Agent, or Firm—Sandler Greenblum & Bernstein

[57] ABSTRACT

An erect image finder is provided in which a real erect image formed by an objective optical system can be observed through an erect image forming optical system having a plurality of reflecting surfaces and an eyepiece optical system. The erect image finder includes a plate-like mirror which constitutes a first reflecting surface of the erect image forming optical system, and a prism separate from the mirror which defines the other reflecting surfaces.

20 Claims, 3 Drawing Sheets

ERECT IMAGE FINDER

BACKGROUND OF THE INVENTION

1. Field of the Invention

The present invention it relates to an erect image finder, and more precisely, relates to a real image type of finder optical system.

2. Description of Related Art

In a real image type of erect image finder which uses a Porro prism, it is known to divide the Porro prism into two prism elements to increase the magnification of the finder. An image forming plane of an objective lens is formed between the divided prism elements. In this arrangement, an eyepiece having a short focal length can be used to observe the image formed on the image forming plane, so that the finder magnification can be increased.

By way of example, a real image type of finder in which a divided Porro prism is employed is disclosed in Japanese Unexamined Patent Publication (Kokai) No. 63-226616. In this known finder, a first prism of the divided Porro prism has an incident surface of predetermined curvature. However, it is impossible to further increase the finder magnification and it is very difficult to shorten the overall length of the finder in the axial direction.

This is because, as best discerned from an analysis conducted by the inventors of the present invention, the emission surface of the first prism and the incident surface of the second prism are both planar in the optical system disclosed in Japanese Kokai No. 63-226616 mentioned above. Accordingly, if the prisms are located far from one another, it is necessary to increase the size of the second prism to receive all the light diffused by and emitted from the first prism. This leads to an increase in the focal length of the eyepiece, which makes it impossible to sufficiently increase the finder magnification. Consequently, the first and second prisms can not be separated from one another, and accordingly, the optical path can not be extended in the lateral direction and a reduction of the axial length of the finder can not be realized.

SUMMARY OF THE INVENTION

The primary object of the present invention is to provide an erect image finder having a large magnification and a short overall length.

To achieve the object mentioned above, according to the present invention, an erect image finder is provided in which a real erect image formed by an objective optical system can be observed through an erect image forming optical system having a plurality of reflecting surfaces and an eyepiece optical system. The erect image finder including a plate-like mirror which constitutes a first reflecting surface of the erect image forming optical system, and a prism separate from the mirror which defines the other reflecting surfaces.

With this arrangement, since the mirror is separated from the prism, the optical path can be extended in the lateral direction, so that the axial length of the finder can be reduced.

In a preferred embodiment of the present invention, an optical element having a positive power is provided between the prism and the mirror. This restricts spreading of the light flux as it passes through the eyepiece optical system (within the prism), and accordingly, the eyepiece optical system can be reduced in size, thereby reducing the length of the light path. This also results in a decrease in the focal length of the eyepiece optical system and an increase in the magnification of the finder.

Preferably, the mirror is oriented so as to bend the optical axis of the finder in the lateral direction. This reduces the overall length and height of the finder optical system.

Alternatively, it is also possible to orient the mirror so as to bend the optical axis of the finder in the vertical direction. This makes it possible to reduce the width of the finder optical system.

If a fixed lens group is provided behind the first reflecting surface, the curvature of the field or the astigmatism can be easily adjusted.

The erect image finder can be mounted to a lens shutter type of camera having a zoom lens (variable power lens) to realize a compact camera and respond to a high zoom ratio.

Preferably, the mirror is made of glass having a high hygroscopicity (large moisture absorptiveness) and being resistant to temperature changes, which may cause a deformation in shape. Consequently, little or no change in diopter occur, thereby achieving stable optical characteristics.

Preferably, the mirror is secured to an immovable portion of the finder so that the mechanical strength thereof is increased thereby resisting change in the diopter.

The present disclosure relates to subject matter contained in Japanese patent application No. 02-321631 (filed on Nov. 26, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
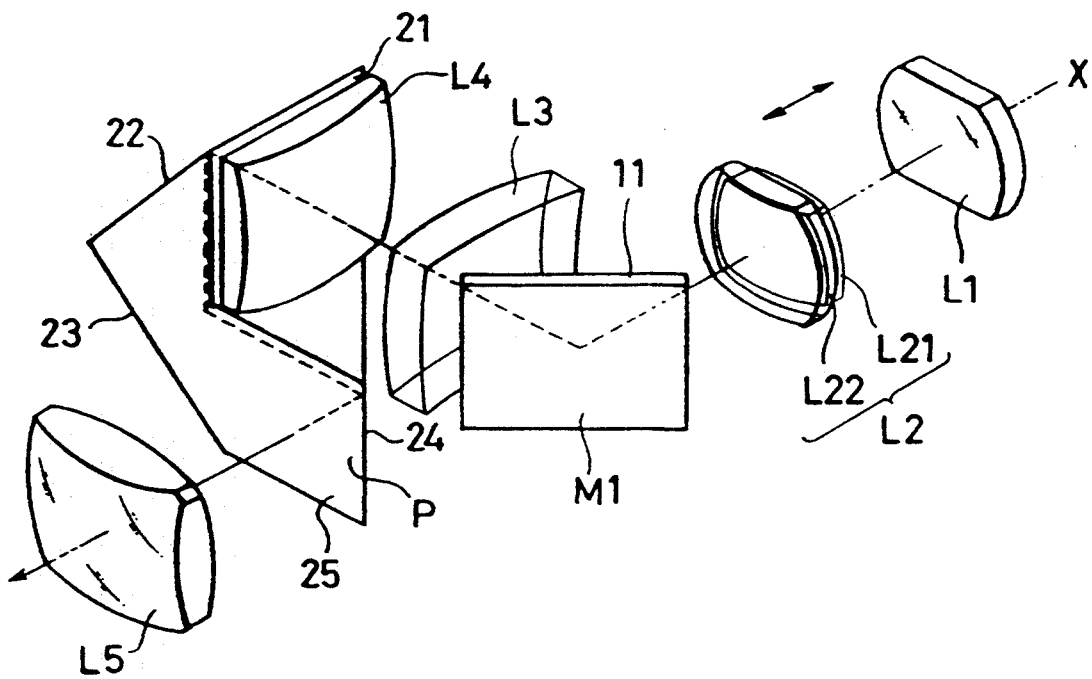
FIG. 1 is a perspective view of a real image type of an erect image finder according to the present invention.
Figure 2:
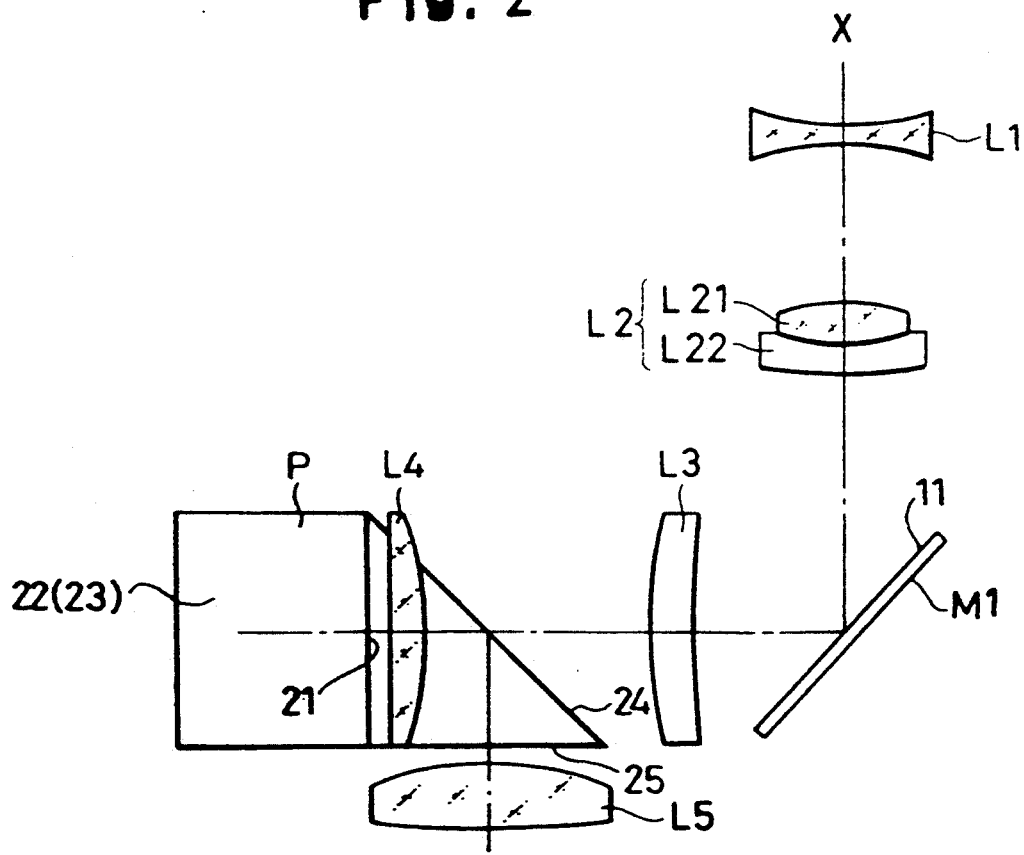
FIG. 2 is a plan view of a FIG. 1.

In FIGS. 1 and 2, the finder includes a first negative lens group L1, a second positive lens group L2 (lenses L21, L22), a mirror M1, a positive field lens L3, a condenser lens L4, a prism P having three total reflection surfaces, and an eyepiece L5, located in this order from the objective side.

The second lens group L2 includes a positive lens L21 and a negative lens L22 adhered thereto and is movable in the optical axis direction to vary the finder magnification (zooming). The axial movement of the second lens group L2 is effected by a driving mechanism (not shown) in association with the power zooming of a photographing lens (not shown).

The mirror M1 has a reflecting surface 11 which bends the optical axis in the lateral direction (i.e. to the left, as can be seen in FIGS. 1 and 2). The prism P has an incident surface 21 and three orthogonal reflecting surfaces 22, 23 and 24, and an emission surface 25. The mirror M1 and the prism P constitute a real erect image forming optical system. The reflecting surface 11 of the mirror M1 defines a first reflecting surface, and the reflecting surfaces 22, 23 and 24 of the prism P define second, third and fourth reflecting surfaces, respectively.

The field lens L3 and the condenser lens L4 located between the mirror M1 and he prim P are secured to a finder securing member (not shown). The image of an object to be taken is formed between the field lens L3 and the condenser lens L4 by an objective optical system (first lens group L1 and second lens group L2).

Figure 3:
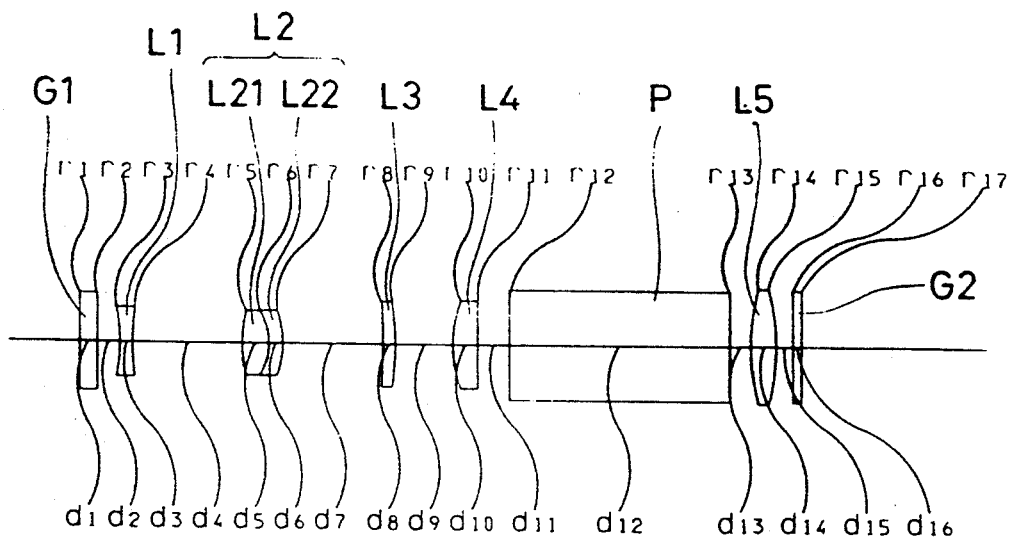
FIG. 3 is a schematic view of a lens arrangement of a finder optical system shown in FIG. 1.

FIG. 3 shows a detail of the lens arrangement in the finder optical system mentioned above. In the arrangement illustrated in FIG. 3, two cover glasses G1 and G2 having parallel planes are provided before and after the first lens group L1 and the eyepiece L5, respectively. In FIG. 3, "r1", "r2", "r3" ... "r17" designate the surfaces of the optical elements (lenses and prism), and "d1", "d2" ... "d16" the distances between the surfaces of the optical elements or the thickness of the optical elements, respectively. Table 1 below shows an example of these values (mm), in which "M" designates the finder magnification, "n" the refractive indexes of the optical elements, and "V" the Abbe's numbers, respectively.

The surfaces r3, r5, r8 and r14 are aspherical surfaces, coefficients of which are shown in Table 2 below. The aspheric coefficient is given by the following equation;

$$X = CY^2/\{1+1-(1+K)C^2Y^2\} + A_4Y^4 A_6Y^6 + A_8Y^8 \ldots$$

TABLE 1

| No | r | d | n | V |
|---|---|---|---|---|
| | | M = 0.47x~1.01x | | |
| 1 | ∞ | 2.10 | 1.49176 | 57.4 |
| 2 | ∞ | 2.65 | — | |
| 3 | −19.143 | 1.50 | 1.58547 | 29.9 |
| 4 | 31.514 | 13.15~2.20 | — | |
| 5 | 14.753 | 3.30 | 1.49176 | 57.4 |
| 6 | −7.040 | 1.70 | 1.58547 | 29.9 |
| 7 | −11.166 | 12.30~23.25 | — | |
| 8 | −96.826 | 1.50 | 1.49176 | 57.4 |
| 9 | −30.000 | 6.95 | — | |
| 10 | 14.500 | 3.00 | 1.49176 | 57.4 |
| 11 | ∞ | 3.75 | — | |
| 12 | ∞ | 26.30 | 1.49176 | 57.4 |
| 13 | ∞ | 2.50 | — | |
| 14 | 23.408 | 3.00 | 1.49176 | 57.4 |
| 15 | −25.868 | 2.00 | — | |
| 16 | ∞ | 1.00 | 1.49176 | 57.4 |
| 17 | ∞ | — | — | |

TABLE 2

| | | | | |
|---|---|---|---|---|
| r3 | K = 0.0000 | $A_4 = 0.1155 \times 10^{-3}$ | $A_6 = -0.5183 \times 10^{-5}$ | $A_8 = 0.1066 \times 10^{-6}$ |
| r5 | K = 0.0000 | $A_4 = -0.2914 \times 10^{-3}$ | $A_6 = 0.5047 \times 10^{-5}$ | $A_8 = -0.1087 \times 10^{-6}$ |
| r8 | K = 0.0000 | $A_4 = -0.5903 \times 10^{-4}$ | $A_6 = -0.1913 \times 10^{-5}$ | $A_8 = 0.4632 \times 10^{-7}$ |
| r14 | K = 0.0000 | $A_4 = -0.4017 \times 10^{-4}$ | $A_6 = 0.0000$ | $A_8 = -0.5280 \times 10^{-7}$ |

Figure 4:
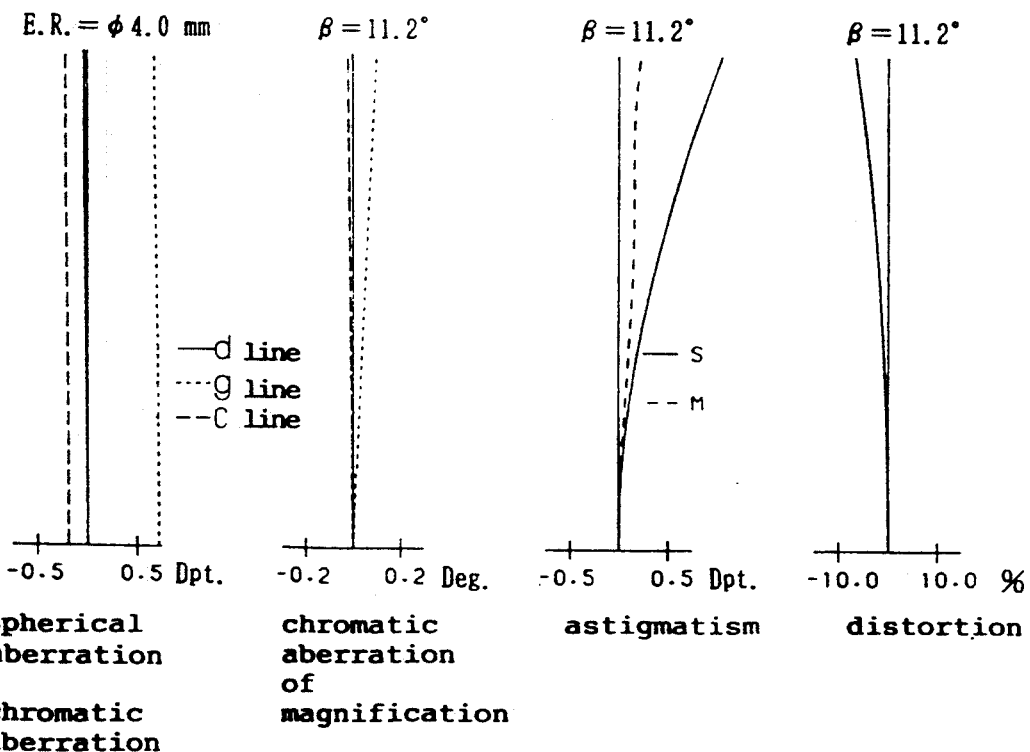
FIG. 4 is a diagram showing optical characteristics with small magnification in a finder shown in FIG. 1; and, FIG. 5 is a diagram showing optical characteristics with large magnification in a finder shown in FIG. 1.
Figure 5:
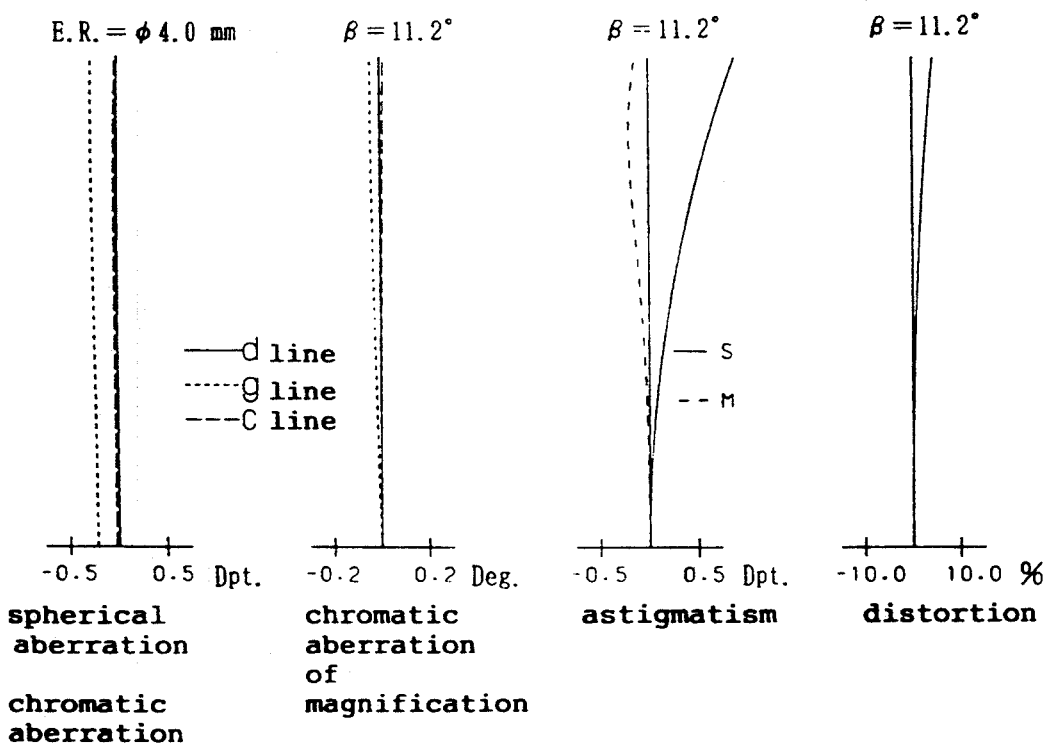

Various optical characteristics of the finder optical system mentioned above are shown in FIGS. 4 and 5, in which "E.R." denotes the exit pupil diameter, "β" the angle of the principal ray of emission light with respect to the optical axis X, "S" the sagittal ray, and "M" the meridional ray. FIGS. 4 and 5 show aberration diagrams (curves) at small and large magnifications, respectively.

As can be seen from the foregoing, in the finder optical system according to the present invention, among the four reflecting surfaces forming a real erect image, the first reflecting surface 11 is constituted by the mirror M1 spaced from the prism P and is included in the objective optical system so that the aerial image is formed behind the first reflecting surface 11. Consequently, the focal length of the objective optical system is increased, thus resulting in an increase of the magnification of the finder.

Furthermore, according to the present invention, since the condenser lens L4 is located directly before the prism P, spreading of the light flux in the eyepiece optical system is restricted, thus the eyepiece optical system, and accordingly the prism P can be miniaturized and the optical path can be shortened. In addition to the foregoing, since the focal length of the eyepiece optical system is reduced, the finder magnification, which is determined by the ratio of the focal length between the objective optical system and the eyepiece optical system can be increased. This can be proved by the fact that the aerial image formed by the objective optical system, constituted by the first and second lens groups L1 and L2, is enlarged and observed through the eyepiece (ocular) optical system which is constituted by the prism P and the eyepiece L5.

In the illustrated embodiment, since the first reflecting surface 11 is located in the vicinity of the pupil of the objective optical system, the diopter is sensitive to a change in shape of the first reflecting surface 11. To overcome this drawback, the mirror is made of glass having a high moisture absorptiveness (hygroscopicity) and having a resistance to temperature changes, thereby preventing a deformation in shape. The present invention utilizes glass with these characteristics so as to realize a stable optical system in which little or no change in diopter takes place. Furthermore, it is possible to firmly hold the first reflecting surface 11, and accordingly, the mirror M1 to thereby increase the mechanical strength thereof, so that a finder optical system having more stable optical characteristics (less diopter change) can be obtained.

Since the positive field lens L3 and the condenser lens L4 are located between the mirror M1 and the incident surface 21, even if the mirror M1 is spaced from the incident surface 21, light reflected by the mirror M1 can be made incident on the incident surface 21. The increased distance between the mirror M1 and the incident surface 21 makes it possible to extend the light path of the finder optical system in the lateral direction (left and right directions), thereby allowing for an equivalent reduction in the axial length of the finder optical system.

Furthermore, since the optical axis X of light reflected by the first reflecting surface 11 is bent in the lateral direction, the height of the finder optical system can be reduced. Accordingly, the height of a camera body to which the finder optical system is mounted at an upper portion of the camera body can be reduced as a whole. Namely, the finder optical system can be advantageously mounted to a thin camera body. Although the optical axis is bent in the lateral direction in the illustrated embodiment, it is possible to bend the optical axis X in the vertical direction. In this alternative, the width of the finder optical system can be reduced.

Since the field lens L3 and the condenser lens L4 located behind the first reflecting surface 11 are fixed, the curvature of the field or the astigmatism, etc. can be easily adjusted. It should be appreciated that the incident surface 21 of the prism P may be made to have a positive power equivalent to the condenser lens L4, rather than using a separate condenser lens.

Although the emission surface 25 of the prism P is made of a flat plane in the illustrated embodiment, it is possible to make the emission surface 25 of an appropriate spherical surface or aspherical surface to reduce the load on the eyepiece L5 to thereby reduce the size of the eyepiece L5 or to effect its aberration adjustment.

As can be understood from the above discussion, according to the present invention, in an erect image finder having an erect image forming optical system, the first reflecting surface is made of a mirror and the subsequent reflecting surfaces are made of a prism. The optical elements having a positive power are provided between the mirror and the incident surface of the prism, thereby making it possible to separate the mirror from the incident surface of the prism, and accordingly, reduce the axial length of the finder. Furthermore, since the prism is included in the ocular optical system, the focal length of the eyepiece can be shortened to increase the magnification.

I claim:

1. An erect image finder in which a real erect image formed by an objective optical system can be observed through an erect image forming optical system having a plurality of reflecting surfaces and an eyepiece optical system, comprising:
   a plate-like mirror which constitutes a first reflecting surface of said erect image forming optical system;
   a prism separated from said mirror and defining the other reflecting surfaces; and
   a fixed lens group provided behind said mirror, said fixed lens group including means for producing a field flattening effect for adjusting the curvature of field, the image of the object to be observed being formed behind said mirror, wherein aid fixed lens group includes at least two lenses that are spaced apart along an optical axis, and the image of the object to be observed is formed between said at least two spaced apart lenses of said fixed lens group.

2. An erect image finder according to claim 1, wherein said mirror is oriented in such a fashion so as to bend the optical axis of the finder in a direction towards the incident surface of said prism.

3. An erect image finder according to claim 2, wherein said mirror is oriented in such a fashion so as to bend the optical axis of the finder towards the incident surface of said prism, in a direction which is horizontal with respect to a normal photographing orientation.

4. An erect image finder according to claim 2, wherein said mirror is oriented in such a fashion so as to bend the optical axis of the finder towards the incident surface of said prism, in a direction which is vertical with respect to a normal photographing orientation.

5. An erect image finder according to claim 1, wherein said mirror is made of glass.

6. An erect image finder according to claim 1, wherein said objecting optical system is one of variable power.

7. An erect image finder according to claim 1, wherein the optical axis of said objective system is substantially parallel with the optical axis of said eyepiece optical system on an emission side thereof.

8. An erect image finder according to claim 1, wherein said fixed lens group comprises an optical element having a positive power and being located in the vicinity of the incident surface of said prism.

9. An erect image finder according to claim 8, wherein said mirror is oriented in such a fashion so as to bend the optical axis of the finder in a direction towards the incident surface of said prism.

10. An erect image finder according to claim 9, wherein said mirror is oriented in such a fashion so as to bend the optical axis of the finder towards the incident surface of said prism, in a direction which is horizontal with respect to a normal photographing orientation.

11. An erect image finder according to claim 9, wherein said mirror is oriented in such a fashion so as to bend the optical axis of the finder towards the incident surface of said prism, in a direction which is vertical with respect to a normal photographing orientation.

12. An erect image finder according to claim 8, wherein said finder is mounted to a lens shutter camera.

13. An erect image finder according to claim 8, wherein said objective optical system is one of variable power.

14. An erect image finder according to claim 8, wherein said mirror is made of glass.

15. An erect image finder according to claim 8, wherein said mirror is secured to an immovable portion of the finder.

16. An erect image finder according to claim 15, wherein said fixed lens group is provided between said mirror and the incident surface of said prism.

17. An erect image finder according to claim 16, wherein said fixed lens group comprises a condenser lens having a positive power.

18. An erect image finder according to claim 17, wherein the optical axis of said objective optical system is substantially parallel with the optical axis of said eyepiece optical system on an emission side thereof 19. An erect image finder according to claim 5, wherein said glass has a high moisture absorptiveness and resistance to temperature changes sufficient to prevent deformation in shape.

20. An erect image finder according to claim 14, wherein said glass has a high moisture absorptiveness and resistance to temperature changes sufficient to prevent deformation in shape.

* * * * *

UNITED STATES PATENT AND TRADEMARK OFFICE
CERTIFICATE OF CORRECTION

PATENT NO. : 5,235,460
DATED : August 10, 1993
INVENTOR(S) : Tetsuya ABE

It is certified that error appears in the above-indentified patent and that said Letters Patent is hereby corrected as shown below:

At column 5, line 43 (claim 1, line 14), change "aid" to ---said---.
At column 6, line 10 (claim 7, line 2), insert ---optical--- after "objective".

Signed and Sealed this

Twenty-first Day of February, 1995

Attest:

BRUCE LEHMAN

Attesting Officer     Commissioner of Patents and Trademarks